(12) United States Patent
Struve

(10) Patent No.: US 10,701,926 B2
(45) Date of Patent: Jul. 7, 2020

(54) METHOD AND DEVICE FOR CONTROLLING UNWANTED ORGANISMS ON A FIELD

(71) Applicant: Deere & Company, Moline, IL (US)

(72) Inventor: Carsten Struve, Ladenburg (DE)

(73) Assignee: Deere & Company, Moline, IL (US)

( * ) Notice: Subject to any disclaimer, the term of this patent is extended or adjusted under 35 U.S.C. 154(b) by 307 days.

(21) Appl. No.: 15/917,187

(22) Filed: Mar. 9, 2018

(65) Prior Publication Data

US 2018/0279599 A1 Oct. 4, 2018

(30) Foreign Application Priority Data

Mar. 29, 2017 (DE) .................. 10 2017 205 293

(51) Int. Cl.
| | | |
|---|---|---|
| *A01M 7/00* | (2006.01) | |
| *G08B 29/10* | (2006.01) | |
| *G06K 9/00* | (2006.01) | |
| *A01M 21/04* | (2006.01) | |
| *A01B 69/04* | (2006.01) | |
| *G09B 29/10* | (2006.01) | |

(52) U.S. Cl.
CPC ......... *A01M 7/0089* (2013.01); *A01B 69/008* (2013.01); *A01M 7/0042* (2013.01); *A01M 21/04* (2013.01); *G06K 9/00657* (2013.01); *G09B 29/106* (2013.01)

(58) Field of Classification Search
USPC .......................................................... 701/50
See application file for complete search history.

(56) References Cited

U.S. PATENT DOCUMENTS

| | | | | |
|---|---|---|---|---|
| 6,199,000 B1 * | 3/2001 | Keller | .................. | A01B 79/005 701/50 |
| 10,255,670 B1 * | 4/2019 | Wu | ...................... | H04N 5/2252 |

(Continued)

FOREIGN PATENT DOCUMENTS

| | | |
|---|---|---|
| DE | 102014201203 A1 | 7/2015 |
| DE | 102014226189 A1 | 6/2016 |

(Continued)

OTHER PUBLICATIONS

U. Shapira et al., "Field spectroscopy for Weed Detection in Wheat and Chickpea Fields," International Journal of Remote Sensing, 2013, vol. 34, No. 17, pp. 6094-6108.

(Continued)

*Primary Examiner* — Tyler D Paige

(57) ABSTRACT

A method for controlling unwanted organisms on a field includes providing an electronic map with expected locations of unwanted organisms in the field entered in georeferenced form and a machine with a supply of agent for treating the unwanted organisms and an output device for controllably applying the agent. The method further includes traversing the field with the machine for application of the agent for controlling the unwanted organisms from the output device, detecting organisms in the field by a sensor on the machine during the traversing step, using the map to controllably guide the machine along the field to the location of unwanted organisms, and controlling the output device to disperse the agent on the field when the sensor detects unwanted organisms.

20 Claims, 3 Drawing Sheets

(56) References Cited

U.S. PATENT DOCUMENTS

| | | | |
|---|---|---|---|
| 2004/0034459 A1* | 2/2004 | Hoelscher | A01M 7/0089 701/50 |
| 2009/0210119 A1* | 8/2009 | Poulsen | A01M 21/04 701/50 |
| 2012/0169504 A1 | 7/2012 | Hillger et al. | |
| 2013/0197767 A1* | 8/2013 | Lenz | A01B 63/00 701/50 |
| 2014/0260148 A1* | 9/2014 | Jens | A01M 21/02 56/10.2 R |
| 2015/0224521 A1* | 8/2015 | Peterson | B05B 12/34 239/7 |
| 2015/0230393 A1* | 8/2015 | Madsen | A01B 69/001 701/50 |
| 2016/0368011 A1* | 12/2016 | Feldhaus | B05B 12/126 |
| 2017/0322550 A1* | 11/2017 | Yokoyama | A01B 63/02 |
| 2017/0339822 A1* | 11/2017 | Gresch | B62D 6/002 |
| 2018/0024050 A1* | 1/2018 | Hollstein | A01M 7/0089 382/103 |
| 2018/0279599 A1* | 10/2018 | Struve | A01M 21/04 |
| 2019/0150357 A1* | 5/2019 | Wu | A01C 21/00 |

FOREIGN PATENT DOCUMENTS

| | | |
|---|---|---|
| WO | 2012122988 A1 | 9/2012 |
| WO | 2016025848 A1 | 2/2016 |
| WO | 2016090414 A1 | 6/2016 |

OTHER PUBLICATIONS

M. Koller et al., "Site-Specific Herbicide Applications Based on Weed Maps Provide Effective Control," California Agriculture, vol. 59, No. 3, pp. 182-187.

H. Böttger et al., "New Technology for Variable Spray Dispensing," Landtechnik Mar. 2003, pp. 142-143.

European Search Report issued in counterpart application No. 18164631.6 dated Aug. 24, 2018. (8 pages).

* cited by examiner

METHOD AND DEVICE FOR CONTROLLING UNWANTED ORGANISMS ON A FIELD

RELATED APPLICATIONS

This application claims priority to German Patent Application Ser. No. 102017205293.7, filed Mar. 29, 2017, the disclosure of which is hereby expressly incorporated by reference in its entirety.

FIELD OF THE DISCLOSURE

The present disclosure relates to a method and a device for controlling unwanted organisms on a field, and a corresponding machine.

BACKGROUND

In agricultural crop production, as a rule not only do the desired plants that have been planted on a field grow, but unwanted organisms, which may be wild or unwanted plants (also called weeds), fungi, or insects, also become established there. So as not to have to put up with overly large losses of yield due to the unwanted organisms, it is common practice to apply spray agents, in order to control the unwanted organisms. A field sprayer, which can be designed as a self-propelled or towed vehicle or as an attachment, is used for this.

For economic and environmental reasons, it is important to apply the spray only where it is in fact required. Two procedures are known in the prior art for selective application of spray.

On the one hand, there is the possibility of entering the location where unwanted organisms are found in an electronic map of the field. The map can be created in a survey of the field carried out before the spray operation, whether manually or by means of a sensor situated on a vehicle or aircraft (see, for example, U. Shapira et al., "Field spectroscopy for Weed Detection in Wheat and Chickpea Fields," International Journal of Remote Sensing, 2013, Vol. 34, No. 17, pp. 6094-6108, or M. Koller et al., "Site-Specific Herbicide Applications Based on Weed Maps Provide Effective Control," California Agriculture, Vol. 59, No. 3, pp. 182-187). Control of the nozzles of the field sprayer takes place automatically on the basis of the map and the current position of the sprayer.

On the other hand, there is also the possibility of outfitting the field sprayer or a vehicle towing or carrying it with a local sensor for unwanted organisms and to detect the organisms (online) while going over the field in order to control the nozzles of the sprayer in terms of an application of the spray to the unwanted organisms that were detected (see, for example, H. Böttger et al., "New Technology for Variable Spray Dispensing," Landtechnik March 2003, pp. 142-143).

A control of the field sprayer based only on a map already produced some time ago (which, as proposed in the literature (M. Koller et al., op. cit.) can, for economic reasons, have been produced in the previous year or even before that) is subject to the disadvantage that the current distribution of the unwanted organisms in the field may no longer absolutely correspond with the map. Moreover, such maps, regardless of the chosen surveillance and logging technology, are not always of sufficiently high resolution and precise enough to reach all unwanted organisms with sufficient reliability and at the same time to waste as little spray as possible due to application of spray to unaffected places in the field.

The local sensor on the other hand suffers from the problem that the field sprayer needs to be moved over the field at a relatively high speed (on the order of magnitude of 10 km/h or higher) in order to keep operating costs at an economically acceptable range. However, the reaction times of the image processing system of the sensor and the valves of the nozzles are currently longer than the time that is actually available between the optical detection of the unwanted organisms by the sensor and the actual opening of the nozzle, and the time becomes even smaller if the sensors are not mounted on the front of the spray vehicle, as described in Böttger et al., but rather are mounted on the spray arm in order to avoid a second arm (see WO 2012/122988 A1). This has the consequence that distances on the order of magnitude of about 10 m cannot be sprayed.

Thus, there is a need for making available a method and a device for controlling unwanted organisms on a field and a corresponding machine to overcome the aforementioned disadvantages in the art.

SUMMARY

In one embodiment of this disclosure, a method for controlling unwanted organisms on a field includes providing an electronic map, in which expected locations of unwanted organisms in the field are entered in georeferenced form; traversing the field with a machine for application of an agent for controlling the unwanted organisms, which comprises a supply of the agent, at least one controllable application device for application of the agent, and a local sensor for detection of undesired organisms, where the map is used for predictive control of a functioning of the machine, while the local sensor serves to control the output device.

In other words, the map is used for predictive control of the machine, while the local sensor serves to control the output device and enables a verification or overriding of the map. Thus, by means of the map one obtains a predictively controlled functioning of the machine, while possible map errors can be corrected by the local sensor. In this way the machine can travel at a relatively high speed on the portions of the field that are not critical, which are predicted not to be populated by unwanted organisms, which saves time and expense, and nevertheless a high precision of the application of the agent becomes possible.

The functioning of the machine predictively controlled by means of a map is an automatic opening of the output device in terms of spraying, with the agent, a location of unwanted organisms that was entered in the map while the local sensor causes an automatic closing of the output device in case that the local sensor does not detect unwanted organisms at the location entered in the map. The map accordingly serves to open the output device when the output device has reached the expected location of unwanted organisms. If the local sensor is not able to detect unwanted organisms at the location, the output device is reclosed. At the critical sites, at which unwanted organisms are expected, the output device thus is open in anticipation and in case the map is shown to be wrong by the sensor, the output device is reclosed.

Moreover, the predictively controlled functioning of the machine can be an automatic reduction of the propulsive speed of the machine in terms of achieving a reduced propulsive speed at the location of unwanted organisms entered in the map, while the local sensor serves to control the output device there. In this variation the original, higher propulsive speed of the machine is predictively reduced at a suitable distance before reaching the expected location of unwanted organisms so that the machine will then travel at the reduced propulsive speed when it (or the local sensor) has reached the expected location in order to be able to control the output device there by means of the signals of the local sensor. Accordingly, the machine slows down at the critical points of the field in order to be able to adjust its propulsive speed to the reaction times of the sensor and the output device. Nevertheless, in spite of the high speed of the machine, a high precision of spray application is achieved.

The opening of the output device can remain unchanged or the propulsive speed can be increased as long as the local sensor is detecting unwanted organisms.

The output device can again be closed as soon as the local sensor no longer detects unwanted organisms.

In particular, while traveling over regions of the field on which no unwanted organisms have been entered in the map, the machine can travel at a first propulsive speed, which is greater than the distance between the region sensed by the local sensor and the point of the field sprayed by the output device divided by the added reaction times of the local sensor and the output device. The reduced propulsive speed can be less than or equal to the distance between the region sensed by the local sensor and the point of the field sprayed by the output device divided by the added reaction times of the local sensor and the output device.

The map can be generated during an earlier passage of the machine over the field. For example, this can be a spray operation that took place in the previous year. Moreover, the map can be generated by another procedure, for example, manual reconnaissance or traveling or flying over the field by means of a suitable robot or a drone or a satellite.

In particular, the unwanted organisms are weeds, insects, or fungi, and the machine designed as field sprayer applies, as the agent, a spray agent that is suitable to control them. However, there are also other conceivable variations. For instance, the unwanted organisms may be snakes, which are controlled by snake poison. Weeds, insects, or other animals can possibly also be controlled mechanically or by radiation, electroshock, etc., so that not only chemicals, but also choppers, radiation, electric currents, etc., are to be understood as agent in the sense of this disclosure.

The local sensor can be attached to a mount mounted on the front of the machine or a vehicle towing or carrying it or on a cross member holding the output device (for example, a spray arm). However, it may be mounted on an aircraft, which flies over the field in front of the machine and is connected to it wirelessly or via a cable (see, e.g., DE 10 2014 201 203 A1).

A device for controlling unwanted organisms in the field is outfitted with a controller, which is connected to an electronic map, in which expected locations of unwanted organisms in the field are entered in georeferenced form, a controllable output device of a machine for application of the agent, which has a supply of an agent for control of the unwanted organism, and a local sensor for detecting unwanted organisms in the field. The controller is configured to use the map for predictive control of a functioning of the machine and to use the local sensor for control of the output device.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
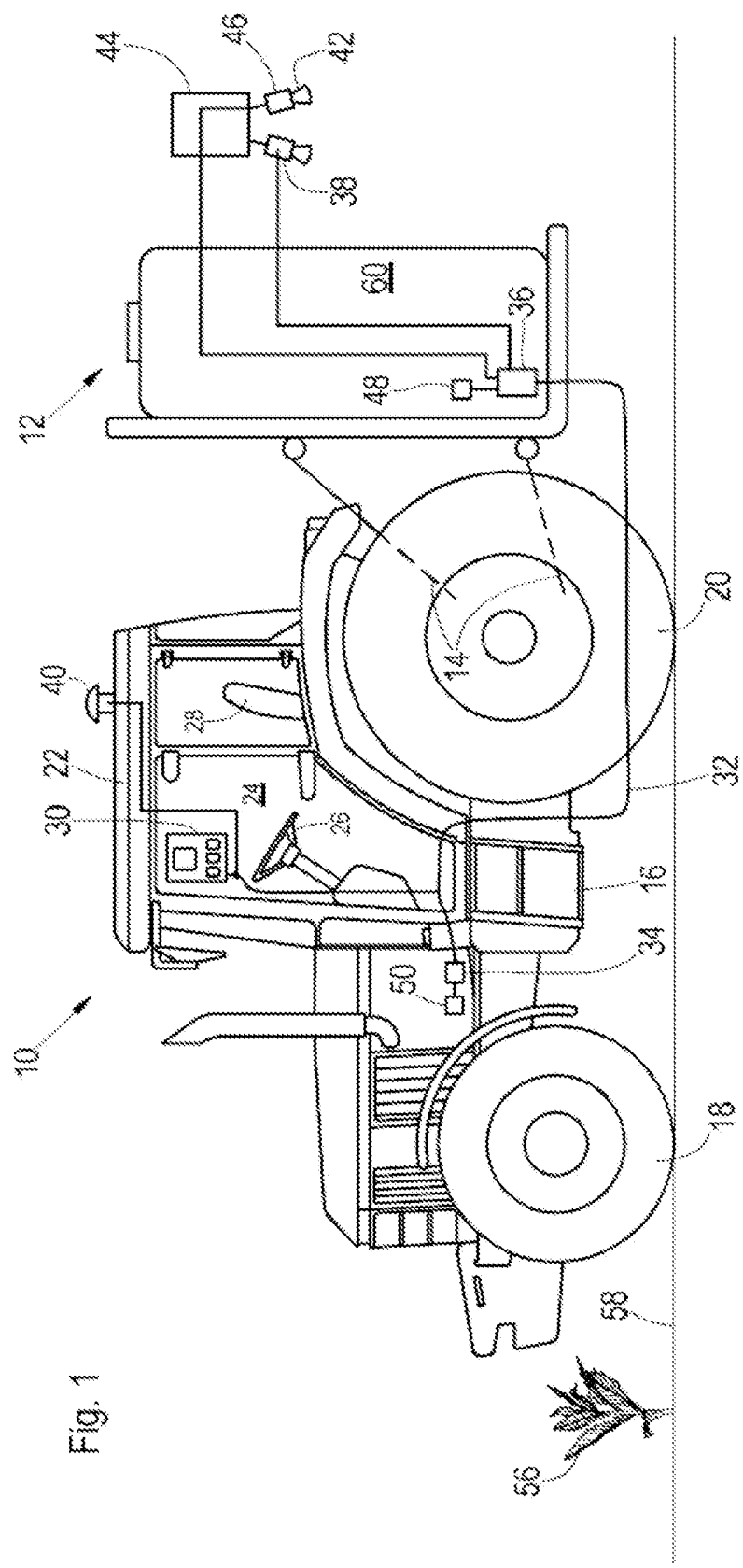
FIG. 1 is a side view of a machine for application of an agent with an associated controller.

FIG. 1 shows a side view of a machine 12 in the form of a field sprayer, which is mounted on a three-point hitch 14 of an agricultural tractor 10. The machine 12 can also be mounted on the tractor 10 or another vehicle (equipment carrier, etc.) or be pulled by the tractor 10, i.e., comprise a chassis with wheels and a tow bar hitched to a hitch of the tractor 10, or can be designed as a self-propelled spray vehicle. The tractor 10 is built on a support frame 16, which is supported on steerable front wheels 18 and driven rear wheels 20 and carries a cab 22, in which there is an operator workplace 24. The operator workplace 24 comprises a steering wheel 26, a seat 28, pedals (not shown), and an operator interface 30.

The operator interface 30, which can be a so-called virtual terminal, is connected to a data transfer device 32, which in the embodiment that is shown can be a serial data bus. Further, a work vehicle controller 34 of the tractor 10, a controller 36 of the machine 12, and a position determining device 40 are connected to the data transfer device 32. All of the devices exchange information with each other via the data transfer device 32 during the operation of the tractor 10. As a rule, additional controllers (not shown) are connected to the data transfer device 32, which can be combined into so-called working ensembles or sets, which jointly communicate with the virtual terminal 30 and possibly other controllers or working sets via the data transfer device 32. The protocol used here corresponds to ISO 11783. However, it is also possible to connect the devices to each other directly or to use any other desired protocol.

The position determining device 40 receives signals from satellites and possibly earth-based transmitters and determines the current position of the tractor 10 in at least two horizontal directions and also its speed and direction of travel. The data are transmitted to the virtual terminal 30 and the controller 36 via the data transfer device 32, etc.

Figure 2:
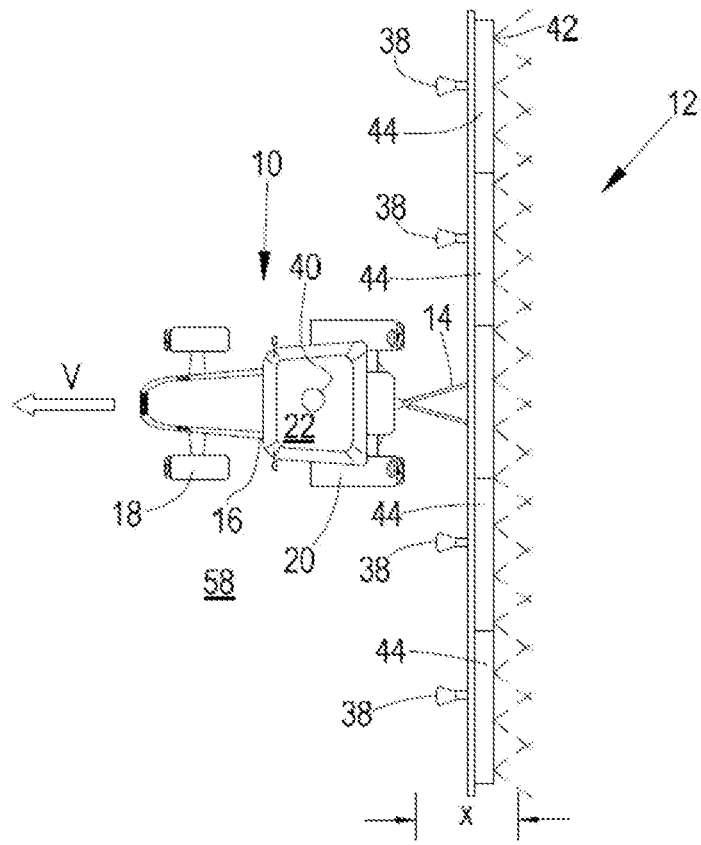
FIG. 2 is a top view of the machine.

Further, a number of local sensors 38 (see also FIG. 2) are connected to the controller 36 directly or via the data transfer device 32. Distributed over the working width of the machine 12, the local sensors 38 are mounted on a cross carrier 44 of the machine 12 and look forward therefrom. The local sensors 38 each include a camera with an image sensor and a processor, on which runs an image processing software that enables the unwanted organisms 56 that are in a field 58 to be recognized by means of the signals. The organisms in this example are wild plants that are not being cultivated in the field 58. The local sensors 38 can thus transmit data to the controller 36 if and possibly at what points unwanted organisms 56 can be detected in the image registered by them.

The work vehicle controller 34 of the tractor 10 is connected to a speed controller 50, which sets the propulsive speed of the tractor 10, by controlling, for example, the rotary speed of a drive engine of the tractor 10 or transmission ratio of a drive transmission connecting the drive engine to the wheels 20 and possibly 18. The tractor 10 is steered by the operator by means of the steering wheel 26 or by an automatic steering controller, which guides the tractor 10 over the field 58 by means of a planned path, in particular by means of existing driving lanes.

The controller 36 is connected via the data transfer device 32 or a separate connection to actuators 46, each of which is associated with an output device 42 (as a rule, designed as nozzles) of the machine 12 and control the rate at which the output device 42 releases spray agent from a storage container 60 onto the field. The output devices 42 are attached to the machine 12 via the cross members 44, which can be folded up for road travel and which also carry the local sensors 38.

The controller 36 is ultimately connected to a storage device 48, in which the previously determined locations of unwanted organisms 56 were entered in a map in georeferenced form. The map may have been created by means of the signals of the local sensors 38 in a previous passage of the machine 12 over the field 58. The tasks of the controller 36 can also be taken on by any other desired controller, for example, by a controller in a virtual terminal 30. The virtual terminal 30 can serve to display to the operator, by means of controller 36, a map of the field and the positions of expected unwanted organisms 56 for which the signals of the position determining device 40 and the storage device 48 can be employed.

Figure 3:
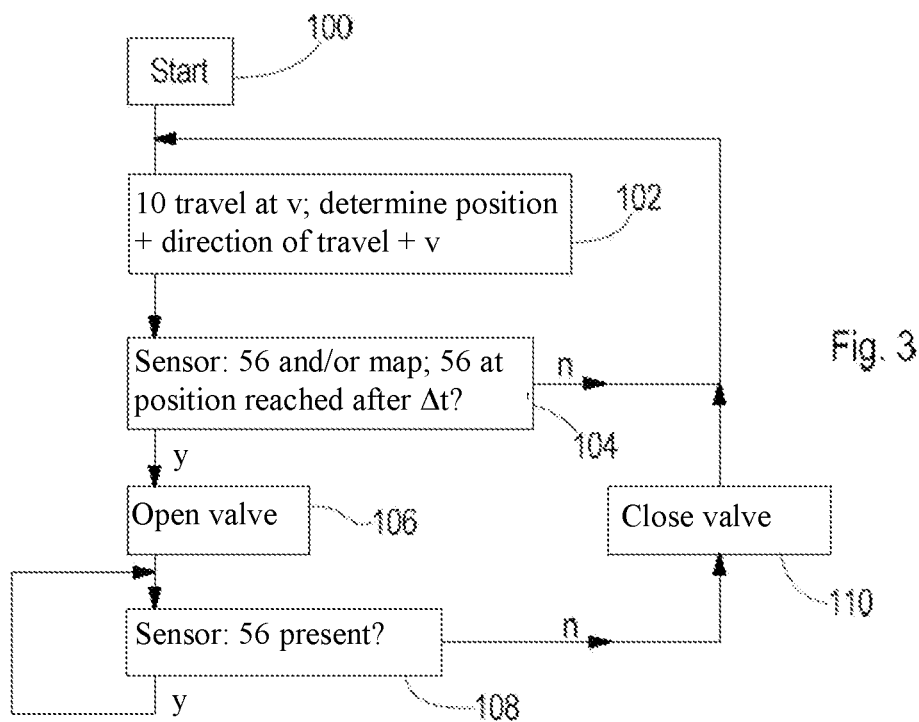
FIG. 3 is a flow chart according to which the controller of the machine works in operation according to a first embodiment.

During the operation of the machine 12 and the tractor 10, the controller 36 proceeds according to the flow chart shown in FIG. 3. After the start in Step 100, in Step 102, the tractor 10 and thus also the machine 12 move over the field 58 at a first propulsive speed v. The first speed v can be preset by the controller 36 and sent as a command to the speed controller 50 via the work vehicle controller 34, or set by the operator via a pedal or a control lever. In addition, in Step 102, the current position of the tractor 10 is determined by means of the signals of the position determining device 40. In addition, its propulsive speed v is determined, for which one can employ the signals of the position determining device 40 or a (radar) sensor interacting with one of the wheels 18, 20, or a sensor interacting with the ground, or an inertial navigation system. The direction of travel of the tractor 10 is also determined by means of a steering angle sensor, an inertial navigation system, or by means of the signals of the position determining device 40.

In Step 104, it is determined by means of the data determined in Step 102 where the tractor 10 (or the output devices 42 of the machine 12) is located after a time $\Delta t$. The time $\Delta t$ corresponds to the reaction time of the actuators 46. In the case of the reaction time of the actuators 46, one must on the one hand take into account their mechanical reaction time, but also on the other hand the time that is required to achieve a sufficient quality of the spray mist. If the reaction time of the speed controller 50 is greater than the reaction time of the actuators, $\Delta t$ can correspond to the reaction time of the speed controller 50. Accordingly, for the locations of the field 58 that the output devices 42 have reached after the reaction time $\Delta t$, a test is made by means of the map in the storage device 48 to see whether or not unwanted organisms 56 are located at one of the locations according to the information stored in the map. It is also possible for a safety zone, the radius of which can be a few meters, to be placed around the mapped locations of the undesired organisms 56. If no undesired organisms are expected at the location, Step 102 is repeated, otherwise Step 106 takes place.

Also in Step 104 the signals of the local sensors 38 are continuously monitored by the controller 36, since unwanted organisms 56 can also be present at locations in the field 58 that were not entered in the map in the storage device 48. If one of the sensors 38 finds such organisms 56 at an unexpected position, Step 106 also takes place and otherwise Step 102.

In Step 106, the controller 36 causes all actuators 46 with unwanted organisms 56 (according to the data in the map in the storage device 48) lying in the active range of the output device 42 associated with the relevant actuator 46 to be instructed by the controller 36 to begin the application of the spray agent.

This is followed by Step 108, in which the controller 36 tests the signals of the local sensors 38 to see if undesired organisms 56 were detected. Step 108 takes place, chronologically, exactly when or shortly after the time $\Delta t$ has elapsed in order to ensure that the sensors 38 detect exactly the position of the field 58 that was entered (in Step 104) in the map of the storage device 48. The controller 36 accordingly tests, by means of the sensors 38, whether the map was correct or not. In the first instance, Step 108 repeats (until none of the sensors 38 see any more unwanted organisms 56) and in the latter case Step 110 takes place, in which the controller 36 instructs the actuators 46 to close again.

The unwanted organisms 56 detected by the local sensors 38 in Step 108 can be entered in georeferenced form in a new map in the storage device 48, which can be used in a subsequent spray operation.

Accordingly, the machine 12 can be moved over the field 58 in a cost-saving way at a relatively high, first speed v that would not enable spraying of unwanted organisms 56 that were recognized only by means of a local sensor 38, since the speed v can be selected to be greater than the distance x (see FIG. 2), measured in the forward direction, between the sensitive regions detected by the sensors 38 in the field 58 and the regions of the field 58 supplied by the output devices 42 divided by a reaction time $\Delta t_2$, which corresponds to the reaction time of the image processing of the local sensors plus the reaction time $\Delta t$. If, on the other hand, the machine 12 reaches unwanted organisms 56, the relevant output device 42 becomes activated in anticipation and the activation of the output device 42 is automatically stopped again when the local sensor 38 does not detect unwanted organisms 56 at the position entered in the map or no longer detects the organisms (after an affected region of the field 58 was passed).

Figure 4:
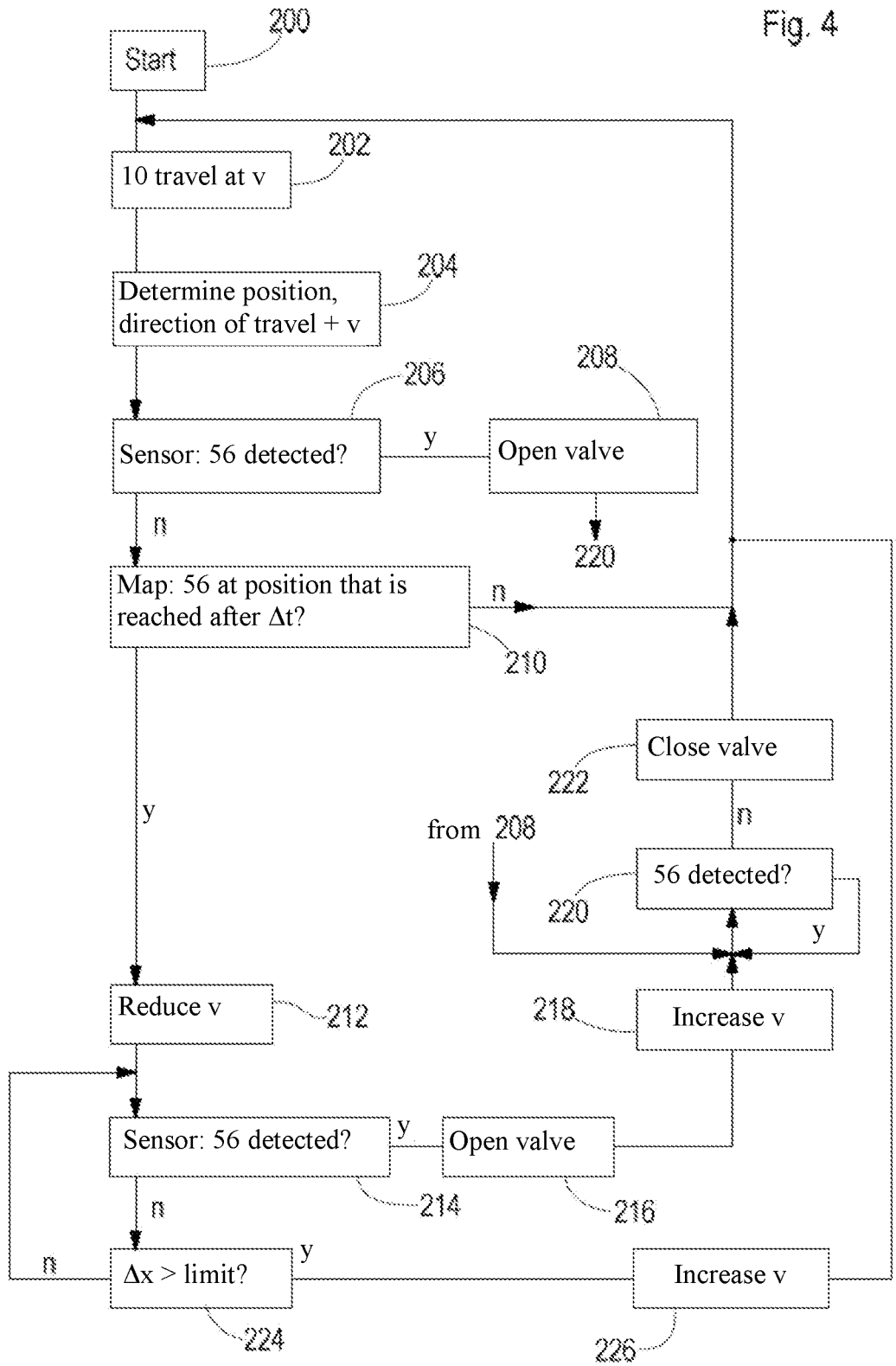
FIG. 4 is a flow chart according to which the controller of the machine works in operation according to a second embodiment.

FIG. 4 shows a second embodiment of a procedure executable by the controller 36. After the start in Step 200, the tractor 10 and thus also the machine 12 are moved over the field 58 at a first propulsive speed v in Step 202. The first speed v can be preset by the controller 36 and sent as a command to the speed controller 50 via the work vehicle controller 34, or it can be set by the operator via a pedal or a control lever. In Step 204, the current position of the tractor 10 is determined by means of the signals of the position determining device 40. In addition, its propulsive speed v is determined, for which one can use the signals of the position determining device 40, a sensor that interacts with one of the wheels 18, 20, a (radar) sensor interacting with the ground, or an inertial navigation system. Also, the direction of travel of the tractor 10 is determined by means of a steering angle sensor or an inertial navigation system or the signals of the position determining device 40.

In Step 206, the signals of the local sensors 38 are continuously monitored by the controller 36, since unwanted organisms 56 can also be present at positions in the field 58 that have not been entered in the map in the storage device 48. If one of the sensors 38 finds such organisms 56 at an unexpected place, Step 208 takes place in which the controller 36 causes all actuators 46 with (according to the signals of the local sensors 38) unwanted organisms 56 lying in the active region of the output device 42 associated with the relevant actuator 46 to be instructed by the controller 36 to begin the application of spray agent. Step 220, described in more detail below, follows Step 208.

If no organisms 56 are detected in Step 206, Step 210 takes place, in which it is determined by means of the data determined in Step 204 where the tractor 10 (or the local sensors 38 of the machine 12) is located after the lapse of a time $\Delta t$. In this regard, one is referred to the identical Step 104 in FIG. 3. Accordingly, for the locations of the field 58 that the local sensors 38 have reached after elapse of the reaction time $\Delta t$, a test is made by means of the map in the storage device 48 to see if unwanted organisms 56 are found on one of these locations according to the data entered in the map. A safety zone, the radius of which can be a few meters, can also be placed around the mapped positions of the undesired organisms 56. If no undesired organisms are expected at a location, Step 202 is repeated, otherwise Step 212 is executed.

In Step 212, the controller 36 causes the propulsive speed to be reduced by means of an instruction transmitted to the speed controller 50 via the work vehicle controller 34. The tractor 10 then thus travels (after elapse of the reaction time of the speed controller 50) at a second speed, which is lower than the first speed.

Step 214 follows, in which the controller 36 tests the signals of the local sensors 38 to see if unwanted organisms 56 were detected. Step 108 takes place, chronologically, exactly then or shortly after the time $\Delta t$ has elapsed, in order to ensure that the sensors 38 detect exactly the position of the field 58 that was entered in the map of the storage device 48. The controller 36 accordingly tests, by means of sensors 38, if unwanted organisms 56 are detected. If this is the case, Step 216 takes place and otherwise Step 226, in which the speed v is increased again, followed by Step 202.

In Step 224, a check is made to see whether a predetermined distance $\Delta x$, which can amount to a few meters, was covered since the place at which unwanted organisms 56 were expected. If this is not the case, Step 214 takes place, and otherwise Step 202. If the sensor 38 does not detect unwanted organisms 56 at the expected place, accordingly application of spray agent does not take place.

However, if one of the sensors 38 in Step 214 detected an unwanted organism, Step 216 takes place, which corresponds to Step 208. Step 216 is followed by Step 218, in which the controller 36 brings the propulsive speed back to the first propulsive speed by means of an instruction transmitted to the speed controller 50 via the work vehicle controller 34. This is followed by Step 220 in which it is queried if one of the sensors 38 is still detecting unwanted organisms 56. If this is the case, Step 220 repeats and otherwise Step 222, in which the actuators 46 of the opened output devices 42 are instructed to stop the application of spray agent. Step 222 is followed again by Step 202.

In the procedure according to FIG. 4 the unwanted organisms 56 detected by means of the local sensors 38 in Step 206 and 214 can also be entered in a new map in the storage device 48 in georeferenced form, which can be used in a subsequent spraying operation.

In the case of the embodiment according to FIG. 4, the machine 12 can be moved in a cost-saving way over the field 58 at the places of the field 58 that are not populated by unwanted organisms 56 at a relatively high, first speed v, which would not allow unwanted organisms 56 detected only by means of a local sensor 38 to be sprayed, since the speed v can be selected to be greater than the distance x measured in the forward direction (see FIG. 2) between the sensitive regions detected in the field 58 by the sensors 38 and the regions of the field 58 supplied by the output devices 42 divided by a reaction time $\Delta t_2$, which corresponds to the reaction time of the image processing of the local sensors plus the reaction time $\Delta t$. Before it reaches unwanted organisms 56, the machine 12 travels at a lower, second speed, which in particular can be selected to be less than the distance x, measured in the forward direction, divided by the reaction time $\Delta t_2$. At the second speed, the controller 36 can still react in a timely way and control an actuator 46 on the basis of the signal of the local sensor 38. The speed reduction is automatically again suspended if the local sensor 38 detects unwanted organisms 56 or no unwanted organisms 56 were detected after traveling a certain distance (Step 224).

The two procedures described in FIGS. 3 and 4 can be combined by, for example, also reducing the propulsive speed in Step 106 of FIG. 3 and raising it again in Step 110 and also in Step 108 after detection of unwanted organisms 56. In this way, the machine 12 can travel sufficiently slowly in a certain region around a location of expected unwanted organisms in order to avoid the disadvantages of the reaction times that were described above. Thus, at places in the field 58 at which unwanted organisms 56 have been mapped, but not found there, it is still possible to travel more slowly for a certain distance $\Delta x$ in order to be able to find possible unwanted organisms 56 in the vicinity of the mapped location, which organisms, for example, are found at an adjacent location due to an inaccurate map or changed growth conditions.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for controlling unwanted organisms on a field, comprising:
   providing an electronic map with expected locations of unwanted organisms in the field entered in georeferenced form;
   providing a machine with a supply of agent for treating the unwanted organisms and an output device for controllably applying the agent;
   traversing the field with the machine for application of the agent for controlling the unwanted organisms from the output device;
   detecting organisms in the field by a sensor on the machine during the traversing step;
   using the map to controllably guide the machine along the field to the location of unwanted organisms; and
   controlling the output device to disperse the agent on the field when the sensor detects unwanted organisms.

2. The method of claim 1, further comprising:
- operably controlling an opening of the output device automatically;
- detecting if there is any unwanted organism at the expected location with a sensor;
- reducing a speed of the machine at the location of the unwanted organisms;
- operably closing the opening when no unwanted organism is detected by the sensor at the location; and
- spraying the agent at the location of the unwanted organisms identified on the map where there is a detected presence of unwanted organisms.

3. The method of claim 2, further comprising operably controlling the output device when there is a detected presence of unwanted organisms.

4. The method of claim 2, further comprising:
- providing a detector in communication with the sensor; and
- retaining the opening of the output device or increasing the speed of the machine as long as the detector or sensor continuously detects unwanted organisms.

5. The method of claim 4, wherein the closing step comprises operably closing the output device if the sensor or detector no longer detect an unwanted organism.

6. The method of claim 1, further comprising:
- traversing the field at a first speed at locations where no unwanted organisms have been entered on the map, the first speed being greater than a distance between a first location sensed by the sensor and a second location of the field sprayed by the output device divided by a sum of reaction times of the sensor and the output device, and
- traversing the field at a reduced speed that is less than or equal to the distance divided by the sum of the reaction times of the local sensor and the output device.

7. The method of claim 1, further comprising generating the map with the sensor during a previous traversal by the machine over the field.

8. A device for use with a spraying machine for controlling unwanted organisms on a field, comprising:
- a controller configured to store or receive via an electrical communication an electronic map of the field including predetermined locations of unwanted organisms in the field entered in georeferenced form,
- a controllable output device of the spraying machine having a supply of a spraying agent for controllably applying the agent to the unwanted organisms on the field, and
- a sensor in communication with the output device or controller, the sensor configured to detect unwanted organisms in the field,
- wherein, the controller operably determines locations of unwanted organisms on the map and operably controls operation of the output device.

9. The device of claim 8, wherein where the sensor is affixed to a mount attached to the front of the machine.

10. The device of claim 8, further comprising a cross carrier that holds the output device, the sensor being coupled to the cross carrier.

11. The device of claim 8, wherein the sensor comprises a camera with an image sensor and a processor for executing an image processing software for identifying unwanted organisms in the field.

12. A machine for controlling unwanted organisms on a field, comprising:
- a controller configured to store or receive via an electrical communication an electronic map of the field including predetermined locations of unwanted organisms in the field entered in georeferenced form,
- a controllable output device of the spraying machine having a supply of a spraying agent for controllably applying the agent to the unwanted organisms on the field, and
- a sensor in communication with the output device or controller, the sensor configured to detect unwanted organisms in the field,
- wherein, the controller operably determines locations of unwanted organisms on the map and operably controls operation of the output device.

13. The machine of claim 12, wherein where the sensor is affixed to a mount attached to the front of the machine.

14. The machine of claim 12, wherein the sensor is coupled to a vehicle towing or carrying the device.

15. The machine of claim 12, further comprising a cross carrier that holds the output device, the sensor being coupled to the cross carrier.

16. The machine of claim 12, wherein:
- the output device comprises an open position for performing a spraying operation and a closed position; and
- the controller operably controls the output device between its open and closed positions.

17. The machine of claim 16, wherein the sensor detects if there is any unwanted organisms at the predetermined locations on the map and communicates this to the controller, and the controller operably controls a speed of the machine as it traverses the field.

18. The machine of claim 17, wherein the controller operably controls the machine between at least a first speed and a second speed, the machine travels at the first speed when the sensor detects a presence of unwanted organisms and at the second speed when the sensor does not detect any unwanted organisms.

19. The machine of claim 16, wherein the controller operably controls the output device to its closed position when no unwanted organisms are detected by the sensor.

20. The machine of claim 16, wherein the controller operably controls the output device to its open position when the machine travels to the predetermined location on the map of unwanted organisms or the sensor detects the presence of unwanted organisms, and the output device is configured to spray the spraying agent on the field.

* * * * *